(12) United States Patent
Shin et al.

(10) Patent No.: US 7,809,484 B2
(45) Date of Patent: Oct. 5, 2010

(54) METHOD AND SYSTEM FOR ADAPTIVELY COMPENSATING CLOSED-LOOP FRONT-WHEEL STEERING CONTROL

(75) Inventors: Kwang-Keun Shin, Rochester Hills, MI (US); Shih-Ken Chen, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/547,467

(22) Filed: Aug. 25, 2009

(65) Prior Publication Data

US 2009/0319130 A1 Dec. 24, 2009

Related U.S. Application Data

(63) Continuation of application No. 11/372,808, filed on Mar. 10, 2006, now Pat. No. 7,599,774.

(51) Int. Cl.
*A01B 69/00* (2006.01)
(52) U.S. Cl. .......................................... 701/42; 701/41
(58) Field of Classification Search .................. 701/41, 701/42; 180/234, 408
See application file for complete search history.

(56) References Cited

U.S. PATENT DOCUMENTS

| | | | | |
|---|---|---|---|---|
| 4,705,130 A * | 11/1987 | Fukunaga et al. | ........... | 180/415 |
| 4,842,089 A * | 6/1989 | Kimbrough et al. | ......... | 180/413 |
| 4,984,646 A * | 1/1991 | Sano et al. | ................... | 180/402 |
| 5,586,031 A * | 12/1996 | Fussl | ........................... | 701/41 |
| 6,456,372 B1 * | 9/2002 | Hudy | .......................... | 356/155 |
| 6,466,857 B1 * | 10/2002 | Belvo | ............................ | 701/82 |
| 6,588,859 B2 * | 7/2003 | Loudon et al. | ............... | 303/146 |
| 6,879,896 B2 * | 4/2005 | Martens | ........................ | 701/41 |
| 7,070,247 B2 | 7/2006 | Offerie | | |
| 7,083,025 B2 * | 8/2006 | Bedner et al. | ................ | 180/402 |
| 7,130,729 B2 * | 10/2006 | Shin et al. | ...................... | 701/42 |
| 7,143,864 B2 | 12/2006 | Mattson et al. | | |
| 7,165,644 B2 | 1/2007 | Offerie et al. | | |
| 7,349,778 B2 | 3/2008 | Shin et al. | | |
| 2003/0114970 A1 * | 6/2003 | Hara | ........................... | 701/41 |
| 2003/0195684 A1 * | 10/2003 | Martens | ........................ | 701/41 |
| 2003/0221899 A1 * | 12/2003 | Bedner et al. | ................ | 180/446 |
| 2005/0278077 A1 | 12/2005 | Shin et al. | | |
| 2006/0020382 A1 | 1/2006 | Shin et al. | | |

OTHER PUBLICATIONS

USPTO, Prosecution History for U.S. Appl. No. 11/372,808.

\* cited by examiner

*Primary Examiner*—Mark Hellner
*Assistant Examiner*—Helal A Algahaim

(57) ABSTRACT

An active front-wheel vehicle steering control system that employs closed-loop control includes an adaptive compensation sub-system that compensates for changes in vehicle dynamic parameters. The control system includes a dynamic parameter estimation sub-system that provides an estimated front cornering compliance and rear cornering compliance based on a steering wheel angle signal, a vehicle lateral acceleration signal, a vehicle yaw rate signal and a vehicle speed signal. The closed-loop control includes active gain for each of vehicle yaw rate, yaw acceleration, side-slip and side-slip rate, all based on the vehicle speed and vehicle dynamic parameter changes for use in generating a steering angle control signal to the front wheels of the vehicle.

8 Claims, 3 Drawing Sheets

METHOD AND SYSTEM FOR ADAPTIVELY COMPENSATING CLOSED-LOOP FRONT-WHEEL STEERING CONTROL

CROSS REFERENCE TO RELATED APPLICATIONS

This application is a continuation of U.S. application Ser. No. 11/372,808, filed Mar. 10, 2006, which is hereby incorporated herein by reference in its entirety.

TECHNICAL FIELD

This invention relates generally to closed-loop control for active vehicle front-wheel steering and, more particularly, to closed-loop control for active front-wheel steering that employs vehicle parameter estimates to compensate for changes in vehicle parameters.

BACKGROUND

It is known in the art to employ automatic front-wheel vehicle steering based on vehicle dynamic information during a vehicle turn, or yaw, to enhance the vehicle stability. Active wheel steering control of a vehicle can improve vehicle stability over a conventional vehicle having only steerable front wheels. Open-loop automatic front-wheel steering provides a certain amount of front-wheel steering assist depending on the amount of front-wheel steering provided by the vehicle operator.

In the event that the vehicle is not following the steering path commanded by the vehicle operator, the closed-loop front-wheel steering is known to provide automatic assist based on vehicle state feedback. For example, slippery road conditions may prevent the vehicle from turning in the desired direction because the wheels may slip along the road surface. Further, the vehicle's rear quarter may "fish-tail," also providing a different turn angle than was intended. Closed-loop front-wheel steering assist systems sense and compare the actual vehicle yaw rate and the commanded yaw rate, and generate a gain signal that provides the steering assist by the front wheels if the vehicle yaw rate and the commanded yaw rate are not the same. In these types of active front-wheel steering control systems, the open-loop control is always active and the closed-loop control is only activated if a potential handling and stability problem is detected.

Vehicles are designed so that the vehicle handling response complies with certain design specifications. Vehicle dynamic parameters define the vehicle handling response, where nominal parameters define a nominal vehicle handling response. The vehicle dynamic parameters of understeer coefficient, front cornering compliance and rear cornering compliance are the most dominant dynamic vehicle parameters for determining the stability and dynamic handling behavior of a vehicle. The understeer coefficient defines the vehicle yaw rate or turning radius for a particular steering angle. The front cornering compliance and the rear cornering compliance define the distribution of the vehicle side-slip to the front and rear axles when the vehicle is turning. The cornering compliances include the ratio defined by the lateral slip angle and the lateral force of the wheels. These parameters vary according to different vehicle loading, tire pressure, tire wear, and vehicle-to-vehicle variations of suspension characteristics, etc.

The control gains for front-wheel steering control systems, including both open-loop and closed-loop control, are optimally determined based on "out-of-factory" vehicle dynamic parameters. During operation of the vehicle over its lifetime, however, the factory-tuned vehicle parameters change as a result of short-term vehicle variations, such as vehicle loading and tire pressure changes, and long-term variations, such as tire wear and vehicle suspension age. When the vehicle dynamic parameters change from their original settings, the original steering control gains are no longer optimal, resulting in a different vehicle handling feel and vehicle stability degradation.

U.S. patent application Ser. No. 10/863,956, titled Real-Time Vehicle Dynamics Estimation System, filed Jun. 9, 2004, assigned to the assignee of this application and herein incorporated by reference, discloses a system that determines vehicle parameter estimates as a vehicle ages. It would be desirable to use such estimated dynamic parameters in a closed-loop front-wheel active steering system to improve the closed-loop steering control gains as the vehicle ages and is subjected to different conditions. By modifying the closed-loop gain schedule in response to estimated vehicle dynamic parameters, the handling feel and directional stability of the original vehicle can be maintained over the lifetime of the vehicle.

SUMMARY

An active front-wheel vehicle steering control method and system is disclosed that employs closed-loop control that includes an adaptive compensation sub-system that compensates for changes in vehicle dynamic parameters. A dynamic parameter estimation sub-system provides an estimated front cornering compliance and rear cornering compliance based on a steering wheel angle signal, a vehicle lateral acceleration signal, a vehicle yaw rate signal and a vehicle speed signal. A closed-loop control sub-system includes active gain for each of vehicle yaw rate, yaw acceleration, side-slip and side-slip rate based on the vehicle speed and vehicle dynamic parameter changes for use in generating a control steering signal to the front wheel.

BRIEF DESCRIPTION OF THE DRAWINGS

One or more embodiments will now be described, by way of example, with reference to the accompanying drawings, in which:

FIGS. 3(a)-6(a) are graphs with vehicle speed on the horizontal axis and gain on the vertical axis showing typical closed-loop gain sensitivity for yaw rate feedback, yaw acceleration feedback, side-slip feedback and side-slip rate feedback, respectively, for changes in the front cornering compliance; and FIGS. 3(b)-6(b) are graphs with vehicle speed on the horizontal axis and gain on the vertical axis showing typical closed-loop gain sensitivity for yaw rate feedback, yaw acceleration feedback, side-slip feedback and side-slip rate feedback, respectively, for changes in the rear cornering compliance.

DETAILED DESCRIPTION

The following discussion of the embodiments of the invention directed to an active front-wheel steering system employing compensation for changes in vehicle dynamic parameters is merely exemplary in nature, and is in no way intended to limit the invention or its applications or uses.

Figure 1:
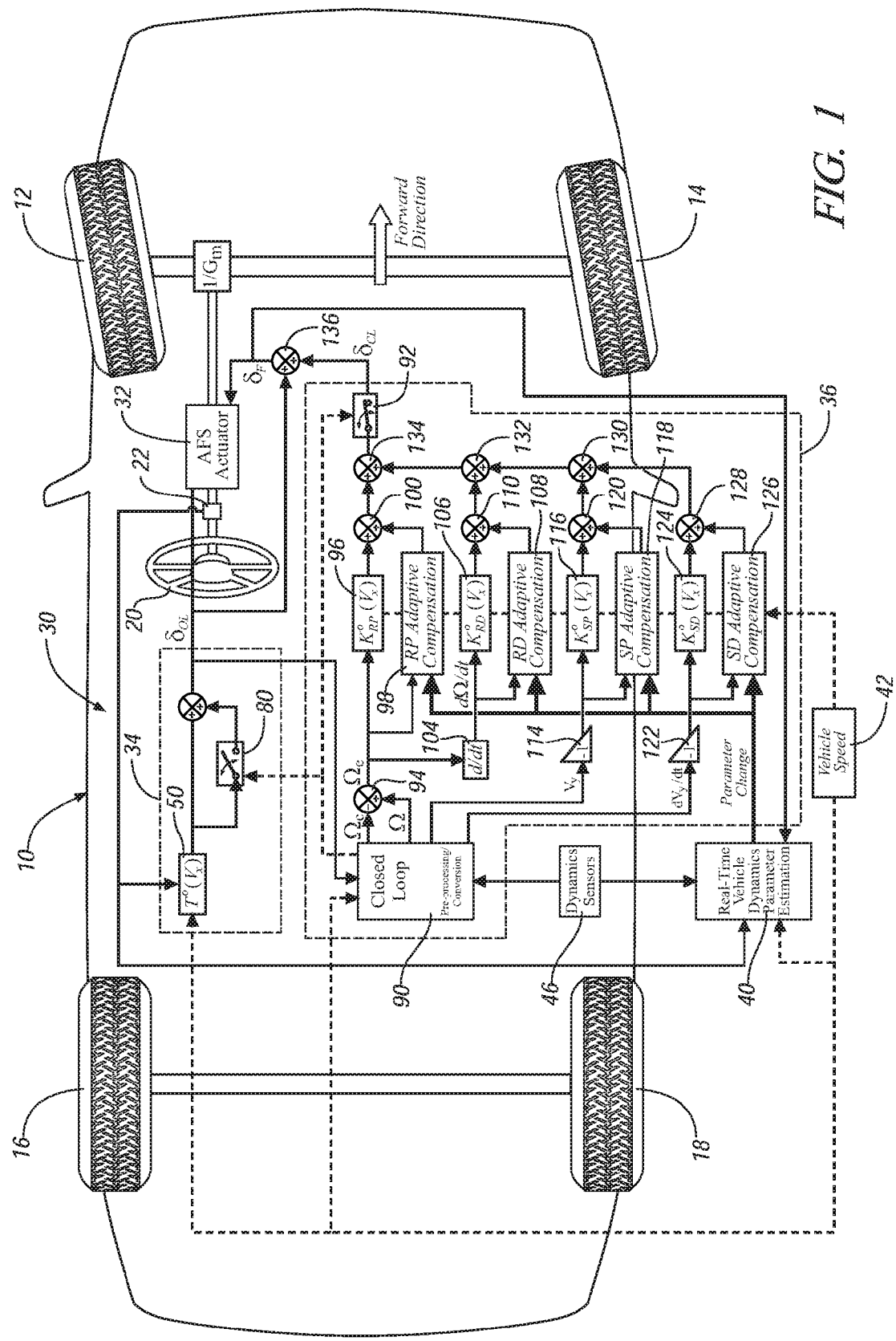
FIG. 1 is a schematic block diagram of a front-wheel steering control system employing estimated vehicle dynamic parameters, according to an embodiment of the present invention.

FIG. 1 is a plan view of a vehicle 10 including front wheels 12 and 14 and rear wheels 16 and 18. The front wheels 12 and 14 are steered by a vehicle steering wheel 20. A steering angle sensor 22 measures the steering angle of the steering wheel 20 and provides a steering wheel angle signal δH. The vehicle 10 includes an active front-wheel steering control system 30 that generates a front-wheel steering control signal δF that is applied to a front-wheel steering actuator 32 to steer the front wheels 12 and 14, as will be discussed in detail below.

The control system 30 includes an open-loop control sub-system 34 that provides an open-loop steering control signal δOL and a closed-loop control sub-system 36 that provides a closed-loop steering control signal δCL. The control system 30 also includes a real-time vehicle dynamics estimation sub-system 40 that estimates the front cornering compliance DF and the rear cornering compliance DR. In one embodiment, the dynamics estimation sub-system 40 is a real-time vehicle dynamics estimation system known in the art that employs a vehicle parameter estimator, a vehicle condition detector and a rich steering input detector for generating an estimated vehicle understeer coefficient and front and rear cornering compliances in real time based on various vehicle signals upon detecting the vehicle operating in a linear region. Alternatively, other real-time vehicle dynamics estimation systems may also be applicable. The control system 30 also includes a vehicle speed sensor 42 that provides a vehicle speed signal Vx to all of the open-loop control sub-system 34, the closed-loop control sub-system 36 and the dynamics estimation sub-system 40. The open-loop control sub-system 34 and the parameter estimation sub-system 40 also receive the steering wheel angle signal δH. The closed-loop control sub-system 36 and the dynamics estimation sub-system 40 both receive a vehicle yaw rate signal Ω and a vehicle lateral acceleration signal Ay from suitable yaw rate and lateral acceleration dynamic sensors 46.

The open-loop control sub-system 34 includes an open-loop look-up table process block 50 that provides an open-loop front-wheel steering angle signal δOL from a look-up table. The open-loop front-wheel steering angle δOL signal as provided by the process block 50 is well known in the art.

The closed-loop sub-system 36 includes a pre-processing block 90 that receives the various sensor signals discussed above. The pre-processing block 90 operates as a command interpreter, provides sensor signal pre-processing and conversion, and provides closed-loop entrance and exit criteria. The pre-processing block 90 provides output signals including the actual vehicle yaw rate signal Ω, a yaw rate command signal Ωc, a vehicle side-slip feedback signal Vy and the derivative of the side-slip feedback signal dVy/dt. The yaw rate signal Ω and the yaw rate command signal Ωc are applied to an adder 94 to obtain a yaw rate error signal Ωe that is the difference between the commanded vehicle yaw rate and the actual vehicle yaw rate. A closed-loop pre-processing block that performs these functions is known in the art, and a detailed discussion of its operation is not necessary for a proper understanding of the invention.

The entrance and exit criteria for the closed-loop front-wheel steering assist are based on the vehicle side-slip and yaw rate errors. If the vehicle side-slip and yaw rate errors are great enough, then the pre-processing block 90 will close a switch 92 so that the closed-loop front-wheel steering command signal δCL is used to help provide the front-wheel steering to properly steer the vehicle. Additionally, the entrance/exit signal is applied a switch 80 so that if the closed-loop signal δCL is being used to help provide the front-wheel steering, then the open-loop signal δOL is not used.

The closed-loop steering signal δCL is a summation of several feedback signals including yaw rate feedback (RP), yaw acceleration feedback (RD), side-slip feedback (SP) and side-slip rate feedback (SD). The yaw rate error signal Ωe is applied to a yaw rate feedback look-up table 96 and a yaw rate feedback adaptive compensation process block 98. The look-up table 96 provides a predetermined yaw rate feedback angle signal based on the nominal front cornering compliance and the rear cornering compliance and the vehicle speed of the vehicle 10 in response to the yaw rate error signal Ωe. Yaw rate feedback look-up tables for a closed-loop front-wheel steering assist system are known in the art. The yaw rate feedback adaptive compensation process block 98 receives the vehicle speed signal Vx and the change in the front and rear cornering compliances ΔDF and ΔDR, and provides a corrected yaw rate feedback angle signal as the front and rear cornering compliances change as the vehicle ages. The original yaw rate feedback angle signal and the corrected yaw rate feedback angle signal are sent to an adder 100 where they are combined to provide an adapted yaw rate feedback angle signal δRP. Equation (1) shows how the adapted yaw rate feedback angle signal δRP is calculated in one non-limiting embodiment.

$$\delta_{RP} = K_{RP}^o(V_x) \cdot (\Omega_c - \Omega) + \left( \frac{\Delta K_{RP}}{\Delta T} \bigg|_o \Delta T(V_x) + \frac{\Delta K_{RP}}{\Delta D_F} \bigg|_o \Delta D_F + \frac{\Delta K_{RP}}{\Delta D_R} \bigg|_o \Delta D_R \right) \cdot (\Omega_c - \Omega) \quad (1)$$

where,
Ω is the yaw rate;
$\Omega_c$ is the yaw rate command;
$K^o{}_{RP}(V_x)$ is the nominal yaw rate feedback gain table as a function of vehicle speed;
$\Delta D_F$ is the change in the front cornering compliance;
$\Delta D_R$ is the change in the rear cornering compliance;
$\Delta T$ is the deviation in the open-loop gain; and $$\frac{\Delta K_{RP}}{\Delta T}\bigg|_o, \frac{\Delta K_{RP}}{\Delta D_F}\bigg|_o, \frac{\Delta K_{RP}}{\Delta D_R}\bigg|_o$$

is the yaw rate P-gain sensitivity to open-loop gain, front cornering compliance, and rear cornering compliance, respectively.

Figure 2:
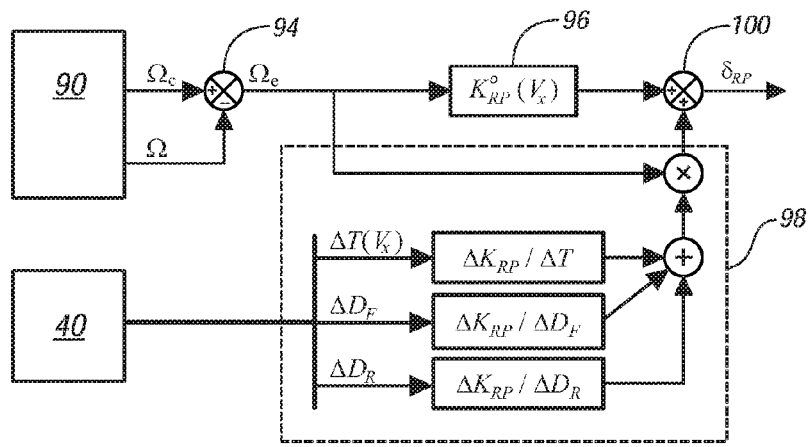
FIG. 2 is a schematic block diagram of the closed-loop yaw rate feedback adaptive compensation process of the present invention.

FIG. 2 is a schematic block diagram of the yaw rate feedback adaptive compensation process block 98. As shown, the yaw rate error signal $\Omega_e$ is multiplied by the corrected yaw rate feedback signal, as determined in accordance with equation (1), and then sent to an adder 100 for adding to the nominal gain to obtain the adapted yaw rate feedback angle signal $\delta_{RP}$. A similar schematic block diagram applies to each of the other gains as well.

Figure 3A:
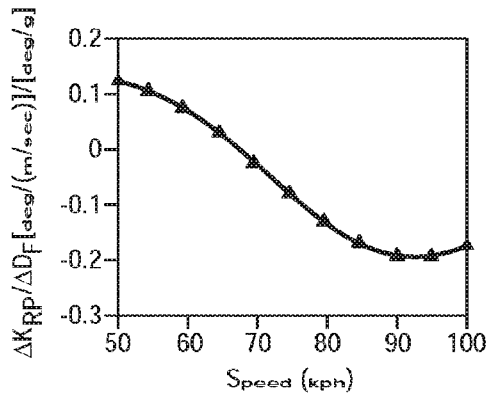
Figure 3B:
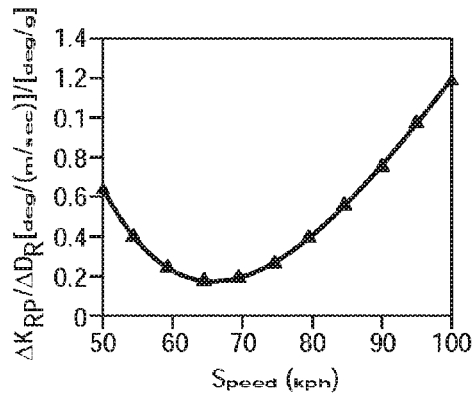

FIGS. 3(a) and 3(b) are graphs with vehicle speed on the horizontal axis and yaw rate feedback angle on the vertical axis showing examples of gain sensitivities corresponding to changes in the front cornering compliance and the rear cornering compliance, respectively.

The yaw rate error signal Ωe is applied to a derivative process block 104 that generates a derivative of the error signal dΩe/dt. The derivative error signal dΩe/dt is applied to a yaw acceleration feedback look-up table 106 and a yaw acceleration feedback adaptive compensation process block 108. The look-up table 106 provides a predetermined yaw acceleration feedback angle signal based on the nominal front cornering compliance and the rear cornering compliance and the vehicle speed of the vehicle 10. Yaw acceleration feedback look-up tables for a closed loop front-wheel steering assist system are known in the art. The yaw acceleration feedback adaptive compensation process block 108 receives the vehicle speed signal Vx and the change in the front and rear cornering compliances ΔDF and ΔDR, and provides a corrected yaw acceleration feedback angle signal as the front and rear cornering compliances change as the vehicle ages. The original yaw acceleration feedback angle signal and the corrected yaw acceleration feedback angle signal are applied to an adder 110 to provide an adapted yaw acceleration feedback angle signal δRD. Equation (2) shows how the adapted yaw rate feedback angle signal δRD is calculated in one non-limiting embodiment.

$$\delta_{RD} = K_{RD}^o(V_x) \cdot (\Omega_c - \Omega) + \left( \begin{array}{c} \frac{\Delta K_{RD}}{\Delta T} \bigg|_o \Delta T(V_x) + \\ \frac{\Delta K_{RD}}{\Delta D_F} \bigg|_o \Delta D_F + \\ \frac{\Delta K_{RD}}{\Delta D_R} \bigg|_o \Delta D_R \end{array} \right) \cdot (\Omega_c - \Omega) \quad (2)$$

where, $K^o{}_{RD}(V_x)$ is the nominal yaw acceleration feedback gain table as a function of the vehicle speed; and $$\frac{\Delta K_{RD}}{\Delta T} \bigg|_o, \frac{\Delta K_{RD}}{\Delta D_F} \bigg|_o; \frac{\Delta K_{RD}}{\Delta D_R} \bigg|_o$$

is the yaw-rate D-gain sensitivity to open-loop gain, front cornering compliance, and rear cornering compliance, respectively.

Figure 4A:
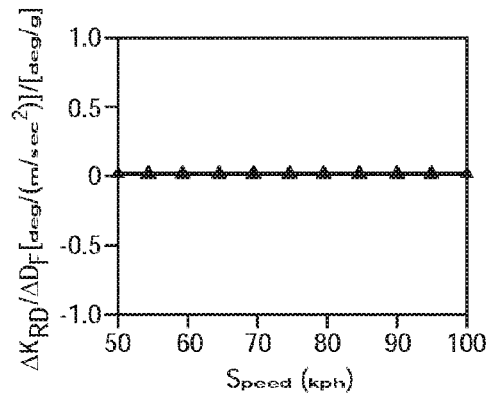
Figure 4B:
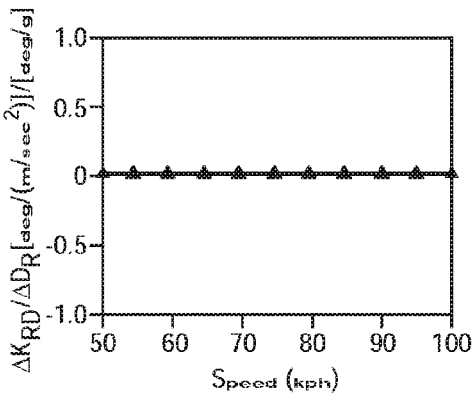

FIGS. 4(a) and 4(b) are graphs with vehicle speed on the horizontal axis and yaw acceleration feedback angle on the vertical axis showing examples of gain sensitivities corresponding to changes in the front cornering compliance and the rear cornering compliance, respectively.

The vehicle side-slip signal Vy from the pre-processing block 90 is applied to an inverter 114 and the inverted side-slip signal is applied to a side-slip feedback look-up table 116 and a side-slip feedback adaptive compensation process block 118. The look-up table 116 provides a predetermined side-slip feedback angle signal for the original front and rear cornering compliances and the vehicle speed of the vehicle 10. Side-slip feedback look-up tables for a closed loop front-wheel steering assist system are known in the art. The side-slip feedback adaptive compensation process block 118 receives the vehicle speed signal Vx and the change in the front and rear cornering compliance signals, and provides a corrected side-slip feedback angle signal as the front and the rear corning compliances change as the vehicle ages. The original side-slip feedback angle signal and the corrected side-slip feedback angle signal are applied to an adder 120 to generate an adapted side-slip feedback angle signal δSP. Equation (3) shows how the adapted side-slip feedback angle signal δSP is calculated in one non-limiting embodiment.

$$\delta_{SP} = K_{SP}^o(V_x) \cdot V_y + \left( \begin{array}{c} \frac{\Delta K_{SP}}{\Delta T} \bigg|_o \Delta T(V_x) + \\ \frac{\Delta K_{SP}}{\Delta D_F} \bigg|_o \Delta D_F + \\ \frac{\Delta K_{SP}}{\Delta D_R} \bigg|_o \Delta D_R \end{array} \right) \cdot V_y \quad (3)$$

where, $K^o{}_{SP}(V_x)$ is the nominal side-slip feedback gain table as a function of the vehicle speed; and $$\frac{\Delta K_{SP}}{\Delta T} \bigg|_o, \frac{\Delta K_{SP}}{\Delta D_F} \bigg|_o; \frac{\Delta K_{SP}}{\Delta D_R} \bigg|_o$$

is the side-slip gain sensitivity to open-loop gain, front cornering compliance, and rear cornering compliance, respectively.

Figure 5A:
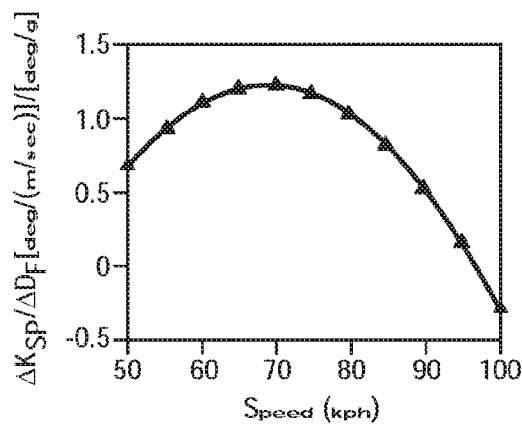
Figure 5B:
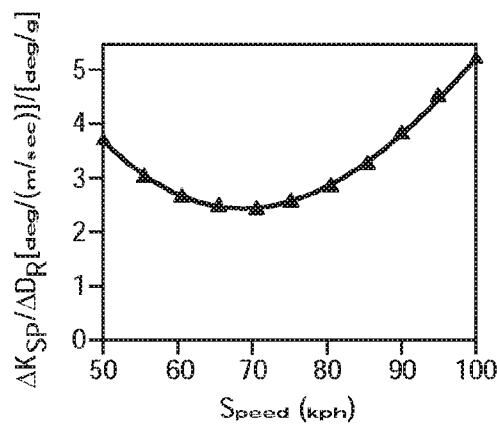

FIGS. 5(a) and 5(b) are graphs with vehicle speed on the horizontal axis and side-slip feedback angle on the vertical axis showing examples of gain sensitivities corresponding to changes in the front cornering compliance and the rear cornering compliance, respectively.

The derivative of the vehicle side-slip signal dVy/dt is applied to an inverter 122, and the inverted side-slip derivative (commonly called side-slip rate) signal is applied to a side-slip rate feedback look-up table 124 and a side-slip rate feedback adaptive compensation process block 126. The look-up table 124 provides a predetermined side-slip rate feedback angle signal based on the nominal front cornering compliance and the rear cornering compliance and the vehicle speed of the vehicle 10. Side-slip rate feedback look-up tables for a closed loop front-wheel steering assist system are known in the art. The adaptive compensation process block 126 receives the vehicle speed signal Vx and the change in the front and rear cornering compliance signals, and provides a corrected side-slip rate feedback angle signal. The original side-slip rate feedback angle signal and the corrected side-slip rate feedback angle signal are applied to an adder 128 that generates an adapted side-slip rate feedback angle signal δSD. Equation (4) shows how the adapted side-slip rate feedback angle signal δSD is calculated in one non-limiting embodiment.

$$\delta_{SD} = K_{SD}^o(V_x) \cdot \dot{V}_y + \left( \begin{array}{c} \frac{\Delta K_{SD}}{\Delta T} \bigg|_o \Delta T(V_x) + \\ \frac{\Delta K_{SD}}{\Delta D_F} \bigg|_o \Delta D_F + \\ \frac{\Delta K_{SD}}{\Delta D_R} \bigg|_o \Delta D_R \end{array} \right) \cdot \dot{V}_y \quad (4)$$

where, $K^o{}_{SD}(V_x)$ is the nominal side-slip rate feedback gain table as a function of the vehicle speed; and $$\frac{\Delta K_{SD}}{\Delta T} \bigg|_o, \frac{\Delta K_{SD}}{\Delta D_F} \bigg|_o; \frac{\Delta K_{SD}}{\Delta D_R} \bigg|_o$$

is the side-slip rate gain sensitivity to open-loop gain, front cornering compliance, and rear cornering compliance, respectively.

Figure 6A:
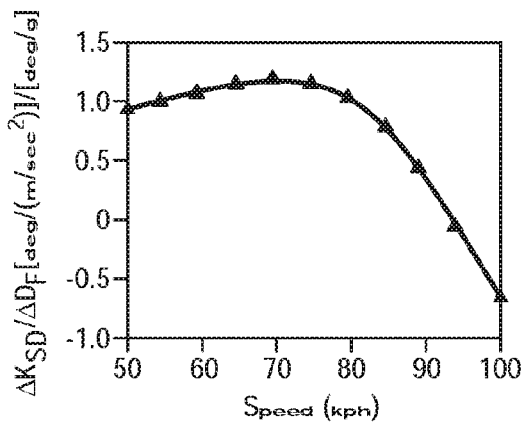
Figure 6B:
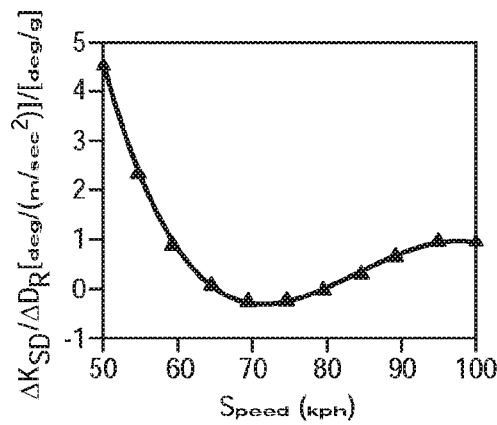

FIGS. 6(a) and 6(b) are graphs with vehicle speed on the horizontal axis and side-slip rate feedback angle on the vertical axis showing examples of gain sensitivities corresponding to changes in the front cornering compliance and the rear cornering compliance, respectively.

The adapted yaw rate feedback angle signal $\delta_{RP}$, the adapted yaw acceleration feedback angle signal $\delta_{RD}$, the adapted side-slip feedback angle signal $\delta_{SP}$ and the adapted side-slip rate feedback angle signal $\delta_{SD}$ are added together by adders 130, 132 and 134 to generate the closed-loop feedback signal $\delta_{CL}$. If the switch 92 is closed, the closed-loop feedback signal $\delta_{CL}$ is added to the open-loop steering signal $\delta_{OL}$ by an adder 136 to generate the front-wheel steering angle signal $\delta_F$ that is applied to the actuator 32.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

The invention claimed is:

1. A method for active front wheel steering control for a vehicle having steerable front wheels and fixed rear wheels, comprising:
   generating a steering wheel angle signal corresponding to a steering wheel angle;
   controlling the steerable front wheels based upon a steering control signal comprising a combination of an open-loop steering control signal and a closed-loop steering control signal;
   estimating vehicle dynamics parameters based upon signal inputs from vehicle sensors;
   providing the open-loop steering control signal corresponding to the steering wheel angle signal;
   providing the closed-loop steering control signal based upon the estimated vehicle dynamics parameters;
   providing an original yaw rate feedback angle signal; and
   providing a corrected yaw rate feedback angle signal based on the estimated vehicle dynamics parameters;
   wherein the corrected yaw rate feedback angle signal is provided in accordance with the relationship:

$$\delta_{RP} = K^o_{RP}(V_x) \cdot (\Omega_c - \Omega) + \left( \begin{array}{l} \frac{\Delta K_{RP}}{\Delta T}\Big|_o \Delta T(V_x) + \\ \frac{\Delta K_{RP}}{\Delta D_F}\Big|_o \Delta D_F + \\ \frac{\Delta K_{RP}}{\Delta D_R}\Big|_o \Delta D_R \end{array} \right) \cdot (\Omega_c - \Omega)$$

where,
$\Omega$ is a yaw rate;
$\Omega_c$ is a yaw rate command;
$K^o_{RP}(V_x)$ is a nominal yaw rate feedback gain table as a function of a vehicle speed;
$\Delta D_F$ is a change in a front cornering compliance;
$\Delta D_R$ is a change in a rear cornering compliance;
$\Delta T$ is a deviation in an open-loop gain; and $$\frac{\Delta K_{RP}}{\Delta T}\Big|_o, \frac{\Delta K_{RP}}{\Delta D_F}\Big|_o; \frac{\Delta K_{RP}}{\Delta D_R}\Big|_o$$

is a yaw rate P-gain sensitivity to the open-loop gain, the front cornering compliance, and the rear cornering compliance, respectively.

2. The method according to claim 1 wherein the signal inputs from vehicle sensors comprise a steering wheel angle signal, a vehicle lateral acceleration signal, a vehicle yaw rate signal and a vehicle speed signal.

3. A method for active front wheel steering control for a vehicle having steerable front wheels and fixed rear wheels, comprising:
   generating a steering wheel angle signal corresponding to a steering wheel angle;
   controlling the steerable front wheels based upon a steering control signal comprising a combination of an open-loop steering control signal and a closed-loop steering control signal;
   estimating vehicle dynamics parameters based upon signal inputs from vehicle sensors;
   providing the open-loop steering control signal corresponding to the steering wheel angle signal;
   providing the closed-loop steering control signal based upon the estimated vehicle dynamics parameters;
   providing an original yaw acceleration feedback angle signal;
   providing a corrected yaw acceleration feedback angle signal based on the estimated vehicle dynamics parameters;
   wherein the corrected yaw acceleration feedback angle is provided in accordance with the relationship:

$$\delta_{RD} = K^o_{RD}(V_x) \cdot (\dot{\Omega}_c - \dot{\Omega}) + \left( \begin{array}{l} \frac{\Delta K_{RD}}{\Delta T}\Big|_o \Delta T(V_x) + \\ \frac{\Delta K_{RD}}{\Delta D_F}\Big|_o \Delta D_F + \\ \frac{\Delta K_{RD}}{\Delta D_R}\Big|_o \Delta D_R \end{array} \right) \cdot (\dot{\Omega}_c - \dot{\Omega})$$

where,
$\Omega$ is a yaw rate;
$\Omega_c$ is a yaw rate command;
$\Delta D_F$ is a change in a front cornering compliance;
$\Delta D_R$ is a change in a rear cornering compliance;
$\Delta T$ is a deviation in an open-loop gain;
$K^o_{RD}(V_x)$ is a nominal yaw acceleration feedback gain table as a function of a vehicle speed; and $$\frac{\Delta K_{RD}}{\Delta T}\Big|_o, \frac{\Delta K_{RD}}{\Delta D_F}\Big|_o; \frac{\Delta K_{RD}}{\Delta D_R}\Big|_o$$

is a yaw acceleration D-gain sensitivity to the open-loop gain, the front cornering compliance, and the rear cornering compliance, respectively.

4. The method according to claim 3 wherein the signal inputs from vehicle sensors comprise a steering wheel angle signal, a vehicle lateral acceleration signal, a vehicle yaw rate signal and a vehicle speed signal.

5. A method for active front wheel steering control for a vehicle having steerable front wheels and fixed rear wheels, comprising:

generating a steering wheel angle signal corresponding to a steering wheel angle;
controlling the steerable front wheels based upon a steering control signal comprising a combination of an open-loop steering control signal and a closed-loop steering control signal;
estimating vehicle dynamics parameters based upon signal inputs from vehicle sensors;
providing the open-loop steering control signal corresponding to the steering wheel angle signal;
providing the closed-loop steering control signal based upon the estimated vehicle dynamics parameters;
providing an original side-slip feedback angle signal;
providing a corrected side-slip feedback angle signal based on the estimated vehicle dynamics parameters;
wherein the corrected side-slip feedback angle signal is provided in accordance with the relationship:

$$\delta_{SP} = K^o_{SP}(V_x) \cdot V_y + \begin{pmatrix} \frac{\Delta K_{SP}}{\Delta T}\bigg|_o \Delta T(V_x) + \\ \frac{\Delta K_{SP}}{\Delta D_F}\bigg|_o \Delta D_F + \\ \frac{\Delta K_{SP}}{\Delta D_R}\bigg|_o \Delta D_R \end{pmatrix} \cdot V_y$$

where,
$\Omega$ is a yaw rate;
$\Omega_c$ is a yaw rate command;
$\Delta D_F$ is a change in a front cornering compliance;
$\Delta D_R$ is a change in a rear cornering compliance;
$\Delta T$ is a deviation in an open-loop gain;
$K^0_{SP}(V_x)$ is a nominal side-slip feedback gain table as a function of a vehicle speed; and $$\frac{\Delta K_{SP}}{\Delta T}\bigg|_o, \frac{\Delta K_{SP}}{\Delta D_F}\bigg|_o; \frac{\Delta K_{SP}}{\Delta D_R}\bigg|_o$$

is a side-slip gain sensitivity to the open-loop gain, the front cornering compliance, and the rear cornering compliance, respectively.

6. The method according to claim 5 wherein the signal inputs from vehicle sensors comprise a steering wheel angle signal, a vehicle lateral acceleration signal, a vehicle yaw rate signal and a vehicle speed signal.

7. A method for active front wheel steering control for a vehicle having steerable front wheels and fixed rear wheels, comprising:

generating a steering wheel angle signal corresponding to a steering wheel angle;
controlling the steerable front wheels based upon a steering control signal comprising a combination of an open-loop steering control signal and a closed-loop steering control signal;
estimating vehicle dynamics parameters based upon signal inputs from vehicle sensors;
providing the open-loop steering control signal corresponding to the steering wheel angle signal;
providing the closed-loop steering control signal based upon the estimated vehicle dynamics parameters;
providing an original side-slip rate feedback angle signal;
providing a corrected side-slip rate feedback angle signal based on the estimated vehicle dynamics parameters;
wherein the corrected side-slip rate feedback angle is provided in accordance with the relationship:

$$\delta_{SD} = K^o_{SD}(V_x) \cdot \dot{V}_y + \begin{pmatrix} \frac{\Delta K_{SD}}{\Delta T}\bigg|_o \Delta T(V_x) + \\ \frac{\Delta K_{SD}}{\Delta D_F}\bigg|_o \Delta D_F + \\ \frac{\Delta K_{SD}}{\Delta D_R}\bigg|_o \Delta D_R \end{pmatrix} \cdot \dot{V}_y$$

where,
$\Omega$ is a yaw rate;
$\Omega_c$ is a yaw rate command;
$\Delta D_F$ is a change in a front cornering compliance;
$\Delta D_R$ is a change in a rear cornering compliance;
$\Delta T$ is a deviation in an open-loop gain;
$K^0_{SD}(V_x)$ is a nominal side-slip rate feedback gain table as a function of a vehicle speed; and $$\frac{\Delta K_{SD}}{\Delta T}\bigg|_o, \frac{\Delta K_{SD}}{\Delta D_F}\bigg|_o; \frac{\Delta K_{SD}}{\Delta D_R}\bigg|_o$$

is a side-slip rate gain sensitivity to the open-loop gain, the front cornering compliance, and the rear cornering compliance, respectively.

8. The method according to claim 7 wherein the signal inputs from vehicle sensors comprise a steering wheel angle signal, a vehicle lateral acceleration signal, a vehicle yaw rate signal and a vehicle speed signal.

* * * * *